United States Patent
Frenkil

(10) Patent No.: US 7,509,613 B2
(45) Date of Patent: Mar. 24, 2009

(54) DESIGN METHOD AND ARCHITECTURE FOR POWER GATE SWITCH PLACEMENT AND INTERCONNECTION USING TAPLESS LIBRARIES

(75) Inventor: Gerald L. Frenkil, Concord, MA (US)

(73) Assignee: Sequence Design, Inc., Santa Clara, CA (US)

( * ) Notice: Subject to any disclaimer, the term of this patent is extended or adjusted under 35 U.S.C. 154(b) by 368 days.

(21) Appl. No.: 11/331,913

(22) Filed: Jan. 13, 2006

(65) Prior Publication Data

US 2007/0168899 A1    Jul. 19, 2007

(51) Int. Cl.
*G06F 17/50* (2006.01)
*H03K 19/20* (2006.01)

(52) U.S. Cl. .................. 716/10; 326/119

(58) Field of Classification Search .................. 716/10, 716/2; 326/81, 119
See application file for complete search history.

(56) References Cited

U.S. PATENT DOCUMENTS

2006/0114025 A1*  6/2006  Frenkil et al. .................. 326/81

* cited by examiner

*Primary Examiner*—Stacy A Whitmore
(74) *Attorney, Agent, or Firm*—Haynes and Boone, LLP

(57) ABSTRACT

A method and a structure provide a space efficient integrated circuit using standard cells and power gating by switch cells. The standard cells may be tapless, i.e., not provided a substrate connection to a power supply or ground rail by a tap within the cell. The substrate connection for these standard cells may be provided by the switch cells or by specialized tap cells. The tapless standard cells may include only a context-sensitive rail, which may be configured to be a virtual ground rail by a power gating connection to a switch cell or by a direct connection to a power supply or ground rail.

3 Claims, 7 Drawing Sheets

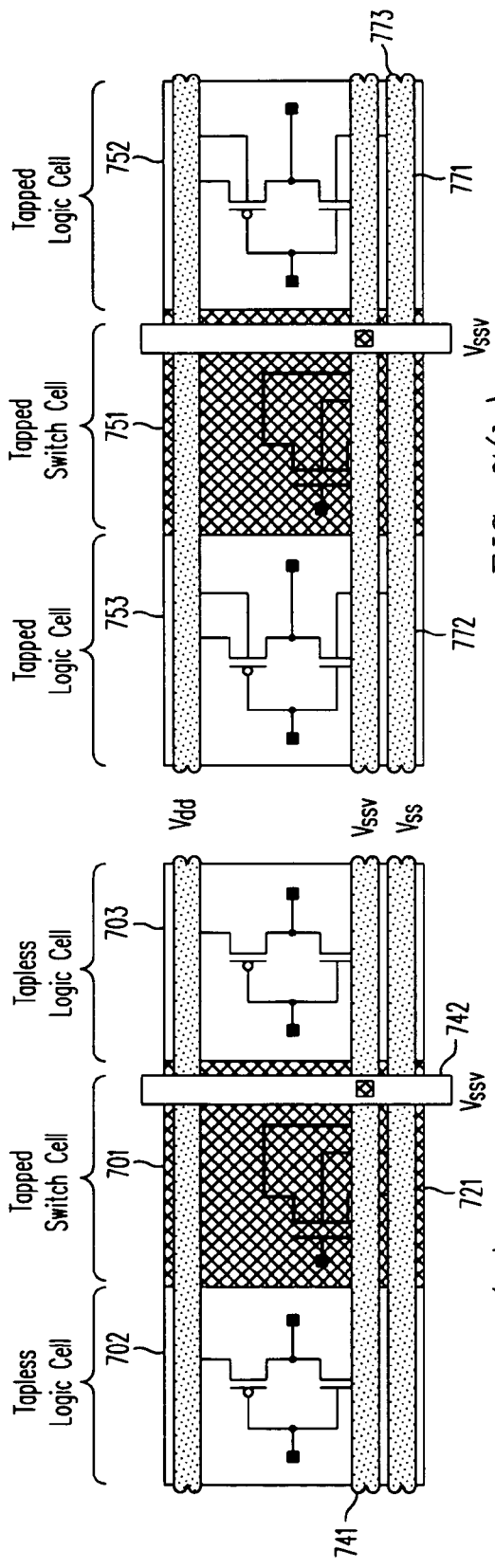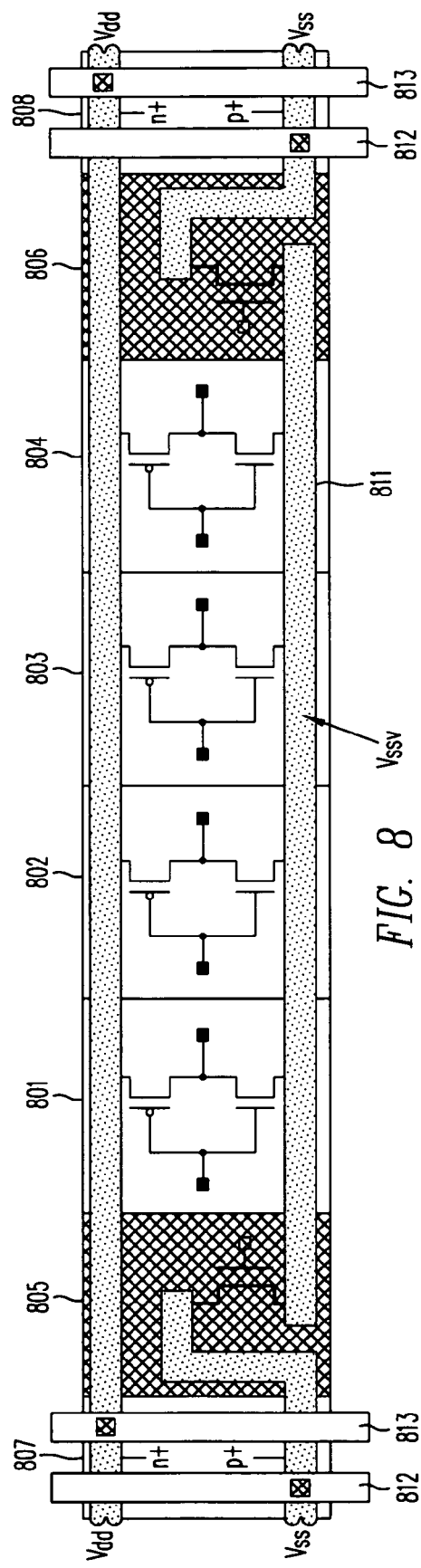

DESIGN METHOD AND ARCHITECTURE FOR POWER GATE SWITCH PLACEMENT AND INTERCONNECTION USING TAPLESS LIBRARIES

BACKGROUND OF THE INVENTION

1. Field of the Invention

The present invention relates to a method for designing multi-threshold complementary metal-oxide-semiconductor (MTCMOS) circuits and the physical architecture of the circuits resulting from using such a method. In particular, the present invention relates to a design method for providing power gating in an MTCMOS circuit using standard cells that provide a "context-sensitive" conductive traces, and the physical circuit architecture of MTCMOS circuits resulting from using this method.

2. Discussion of the Related Art

A significant concern in integrated circuit design is reducing leakage currents. Leakage currents flow in logic circuits from a power supply node into the ground node because the switching characteristics of the transistors in the logic circuits are not ideal (i.e., the transistors cannot be completely shut off).

In MTCMOS circuits, one technique that reduces leakage current is to a place a "power gate" (also known as "power switch" or simply, "switch cell") between the lowest potential terminal of a logic gate (the "virtual ground" reference) and the ground reference. This technique is illustrated schematically in FIG. 1, which shows power gate or switch cell 101 controlling the leakage current path of logic cell 102 to ground. As shown in FIG. 1, logic cell 102 is formed using lower threshold voltage transistors to provide short switching times. The power gate is typically a transistor which has a higher threshold voltage than the threshold voltage of the transistors used to implement the logic cells. The power gate interrupts the leakage current path to ground. When power gate 101 is conducting (i.e., a high voltage is provided at control node 106), a leakage current flows from power supply node 104 through logic cell 102 to virtual ground node 103, and through power gate 101 to true ground node 105. However, during standby (i.e., when a voltage much less than power gate 101's threshold voltage is imposed at control node 106), power gate 101 cuts off the leakage current path from virtual ground node 103 to true ground node 105.

Several design methods have been used to provide power gate cells. One method ("integrated switches"), as illustrated by way of example in FIG. 2, integrates power gate 202 with logic cell 201. In this arrangement, logic cells, such as logic cell 201, are placed in rows according to a conventional standard cell design method. As shown in FIG. 2, conductors 204a and 204b are part of a power supply grid providing a power supply voltage to the logic cells. Similarly, conductors 203a and 203b are part of a ground reference grid providing a true ground reference to the logic cells. Virtual ground nodes are located within each logic cell (e.g., logic cell 201).

FIG. 3 illustrates a second method ("cavity switches") for placing power gates, in which a row of logic cells (e.g., logic cells 301a, 301b, 301c and 301d) share power switches provided in an adjacent dedicated row ("switch cavity area"; e.g., power switch cavity area 302). Conductors 303a and 303b provide the true ground voltage reference, and conductors 304a and 304b provide the power supply voltage reference.

FIG. 4 illustrates a third method ("ring switches") for placing power gates, in which a group of logic cells (e.g., logic cell 401) share power switches placed in an annular strip (e.g., power gate area 402) encircling the logic cells. Power switches within power gate area 402 are typically connected in parallel. Conductors outside power gate area 402 route the true ground to the power gates in power gate area 402, Virtual ground reference nodes are provided in the area between power gate area 402 and logic cells 401.

FIG. 5 illustrates a fourth method ("grid switches") for placing power gates, in which power switches (e.g., power switches in power switch areas 502a and 502b) are placed in predetermined locations at regular intervals to service rows of logic cells in their proximity (e.g., logic cells 502a and 501b are serviced by power switches in power switch 502a). The power switches in the predetermined power switch areas may be connected in parallel, and conductors (e.g., conductors 505a, 505b and 505c) running orthogonal to the rows of logic cells may provide a virtual ground reference grid.

The grid switches method, as illustrated in FIG. 5, requires standard cells that include the virtual ground rail ($V_{ssv}$) as a third supply rail, in addition to the usual power ($V_{dd}$) and ground ($V_{ss}$) rails. This method is further illustrated in FIG. 6. In FIG. 6, standard cells 621 and 622 are connected to virtual ground wire 623 (running horizontally), which is connected by switch cell 626 to ground wire 624. Virtual ground wire 623 is connected to other virtual ground wires by virtual ground bus 625 (running vertically). A considerable silicon area cost is therefore incurred in providing the third rail.

In a standard cell of the prior art, one or more well taps (i.e., each a connection to the P-well or N-well substrate of the PMOS or NMOS transistors in the standard cell) are provided within the standard cell, so that a high resistance does not develop between the substrate of the transistors in the standard cell and the power or ground reference.

SUMMARY

According to one embodiment of the present invention, a method and a structure provide a space efficient integrated circuit using standard cells and power gating by switch cells. The standard cells may be tapless, i.e., not provided a substrate connection to a power supply or ground rail by a tap within the cell. The substrate connection for these standard cells may be provided by the switch cells or by specialized tap cells. The tapless standard cells may include only a context-sensitive rail, which may be configured to be a virtual ground rail by a power gating connection to a switch cell or by a direct connection to a power supply or ground rail.

According to one embodiment of the present invention, multiple switch cells may be placed along a row of standard cells, such that a pair of neighboring switch cells configures a segmented virtual power supply or virtual ground rail for the standard cells placed between the pair of switch cells. The segmented virtual power rails in the integrated circuit may be interconnected global by virtual ground or virtual power supply buses.

In one embodiment, the tap cells provide routing resources for globally interconnecting the virtual power supply or ground rails configured by the switch cells.

The integrated circuits of the present invention require less routing resources and achieve higher circuit densities than the prior art.

The present invention is better understood upon consideration of the detailed description below and the accompanying drawings.

BRIEF DESCRIPTION OF THE DRAWINGS

FIG. 7, which is subdivided into FIGS. 7a and 7b, illustrates the advantages of a tapless design using switch cells.

FIG. 8 illustrates the tapless switch cell and its use in a grid switches type design method, in accordance with a first embodiment of the present invention.

DETAILED DESCRIPTION OF THE PREFERRED EMBODIMENTS

Figure 1:
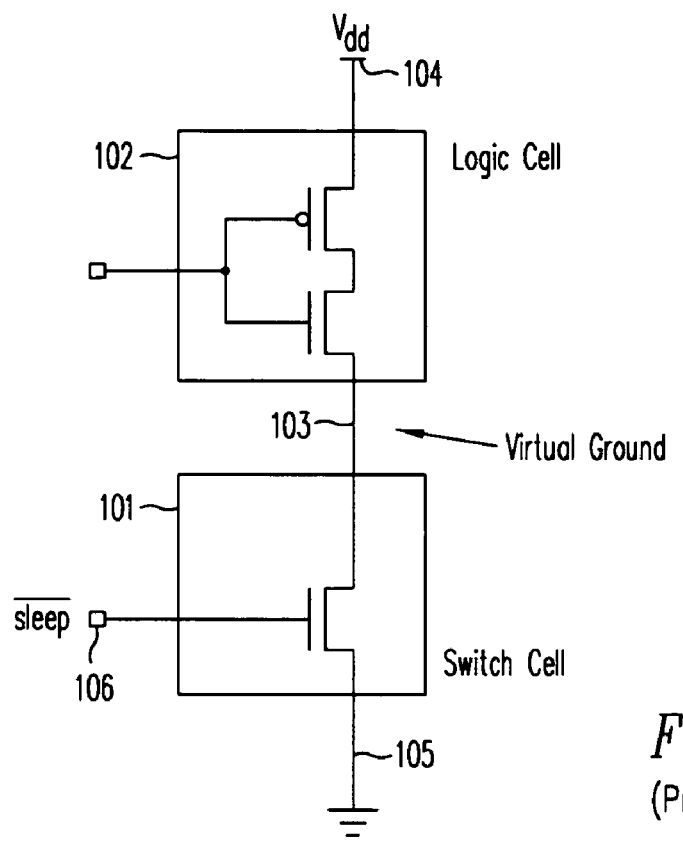
FIG. 1 shows schematically power gate or switch cell 101 controlling the leakage current path of logic cell 102 to ground.
Figure 2:
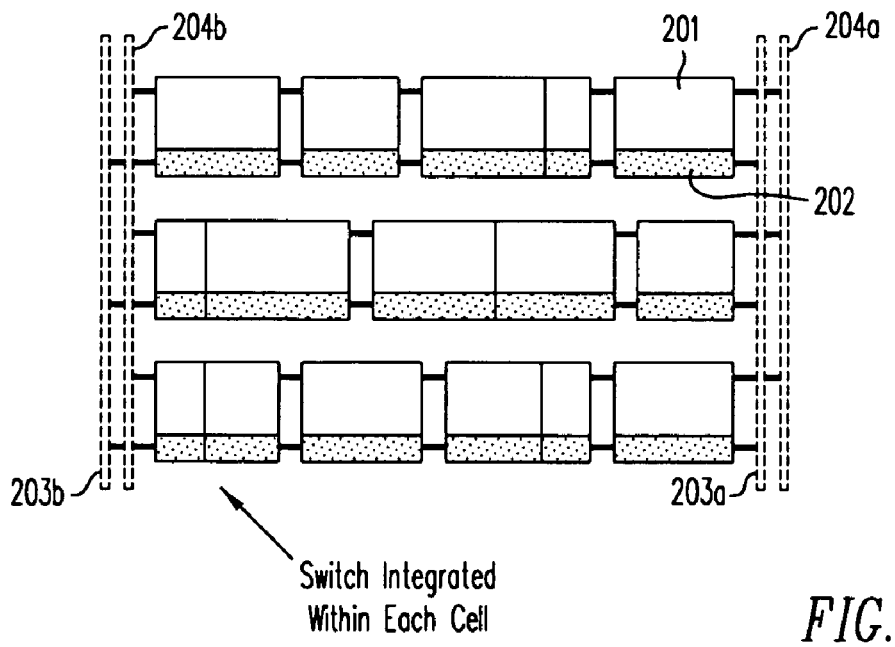
FIG. 2 illustrates logic cell 201 integrating power gate 202; logic cell 201 may be placed using a conventional standard cell design method.
Figure 3:
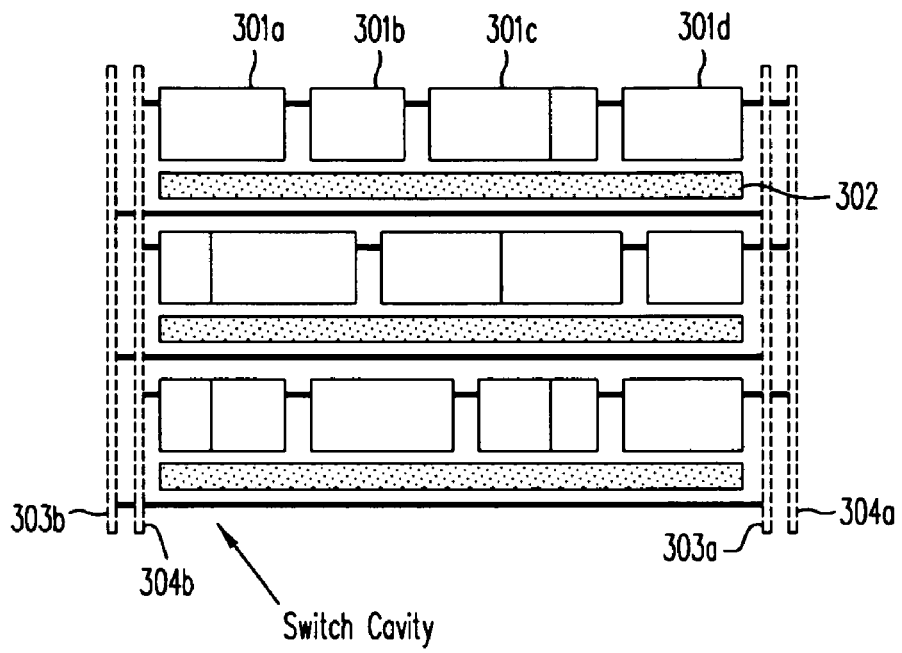
FIG. 3 illustrates a second method for placing power gates, in which a row of logic cells (e.g., logic cells 301a, 301b, 301c and 301d) share power switches provided in an adjacent dedicated row ("switch cavity area"; e.g., power switch row 302).
Figure 4:
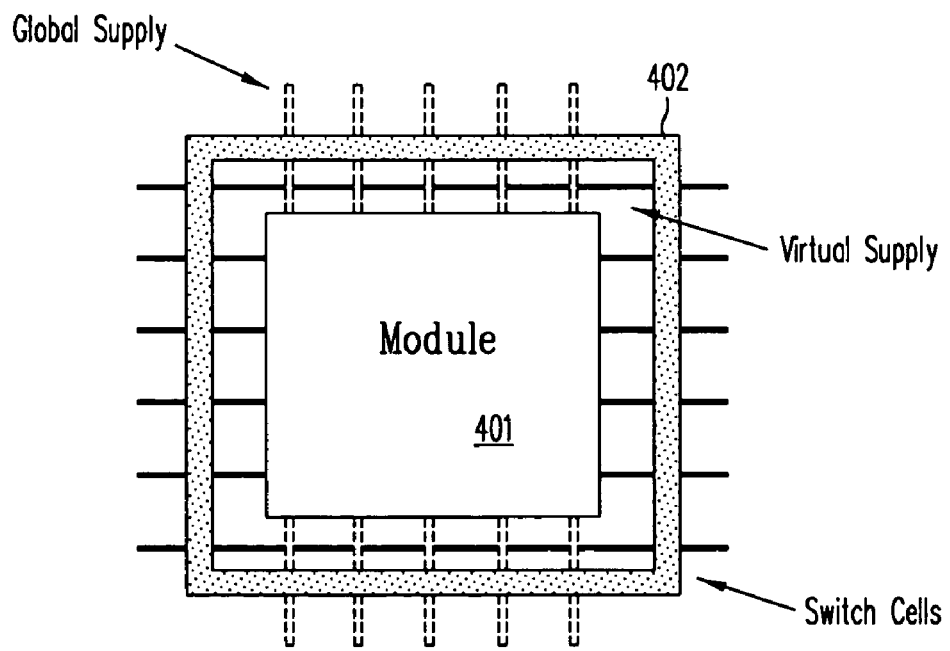
FIG. 4 illustrates a third method for placing power gates, in which a group of logic cells (e.g., logic cell 401) share power switches placed in an annular strip (e.g., power gate area 402) encircling the logic cells.
Figure 5:
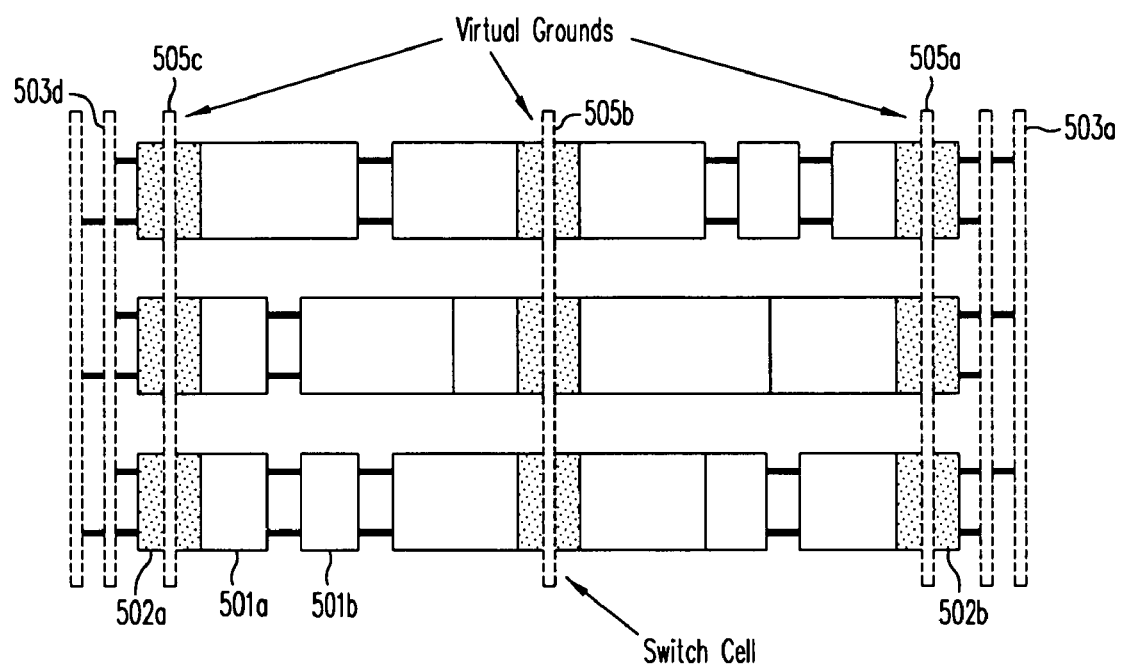
FIG. 5 illustrates a fourth method ("grid switches") for placing power gates, in which power switches (e.g., power switches in power switch areas 502a and 502b) are placed in predetermined locations at regular intervals relative to rows of logic cells.
Figure 6:
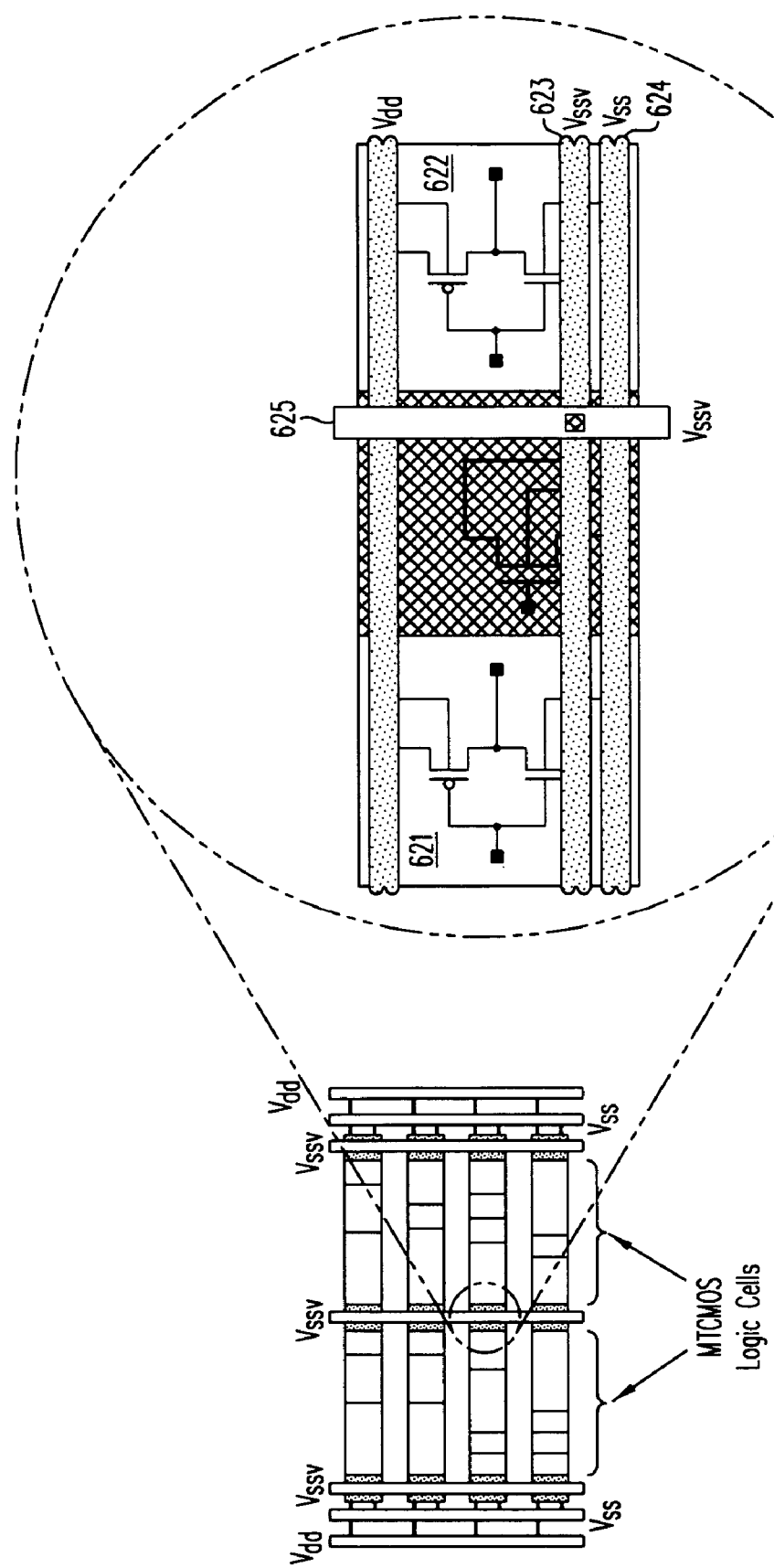
FIG. 6 shows, in one example of the grid switches approach of FIG. 5, standard cells 621 and 622 being connected to virtual ground wire 623, which is connected by switch cell 626 to ground wire 624.

The present invention is applicable to integrated circuits designed using a "tapless" library. In a tapless library, the transistors in a standard cell are not provided within the standard cell the conventional tap connections to their appropriate P-well or N-well ("substrate"), so as to reduce the area requirement. Instead, a well tap is provided in the switch cells to connect the substrate with the appropriate ground or power supply reference. In an integrated circuit built from a tapless library, switch cells are placed among the standard cells at regular or approximately regular intervals, or within a selected distance (e.g., 50 microns), so that the standard cells that share a substrate with a switch cell may share the switch cell's low resistance substrate connection to the power supply or ground reference.

FIG. 7, which is subdivided into FIGS. 7a and 7b, illustrates the advantages of using tapless standard cells power-gated by switch cells to form an integrated circuit. As shown in FIG. 7a, well tap 721 is included in switch cell 701, which provides power gating to tapless standard cells 702 and 703. In contrast, FIG. 7b shows switch cell 751 providing power gating to "tapped" standard cells 752 and 753, which includes well taps 771 and 772 connecting substrates of their transistors to the true ground reference wire 773. As seen in FIGS. 7a and 7b, tapless standard cells 702 and 703 can be made smaller than counterpart standard cells 752 and 753, as tapless standard cells do not include well taps. In FIG. 7a, vertical virtual ground bus 742 may be used to connect virtual ground wires throughout the integrated circuit.

As shown in FIG. 7a, while this method reduces the standard cell area, routing overhead still exists for routing horizontal conductor 741 and vertical conductor 742.

The circuit configurations of FIGS. 7a and 7b can be provided in the same row of standard cells.

According to one embodiment of the present invention, a specialized tapless switch cell further improves area efficiency for an integrated circuit that uses standard cells from a tapless library and a grid switches placement style. In such an integrated circuit, connections between the substrate and the ground reference (or power supply reference) are achieved by separate "tap" cells. Using this tapless switch cell, separate horizontally running $V_{ss}$ and $V_{ssv}$ rails are eliminated from the standard cells.

Instead, each standard cell in a tapless library need only provide a "context-sensitive" rail which serves as a virtual ground wire (i.e., a $V_{ssv}$ rail) when power gated by the specialized switch cell to the $V_{ss}$ or $V_{dd}$ rail. When directly connected to a $V_{ss}$ or $V_{dd}$ rail, the context-sensitive rail becomes a horizontally running $V_{dd}$ or $V_{ss}$ rail.

FIG. 8 illustrates the tapless switch cell and the design style achieved using a grid switches type design method. As shown in FIG. 8, standard or logic cells 801-804 and switch cells 805 and 806 each include only a horizontally running context-sensitive ground wire 811. The power switch transistor in each of switch cells 805 and 806 power gates a context-sensitive rail. Tap cells 807 and 808 includes well taps to real ground and power supply references and vertically running connections to power buses 812 and 813, providing the true ground ($V_{ss}$) and power ($V_{dd}$) rails.

Using the design method of FIG. 8, area efficiency is significantly increased for two reasons. First, the context-sensitive wire 811 obviates the additional horizontal wire for routing the $V_{ssv}$ rail in each logic cell. Context-sensitive wire 811 may be used for $V_{ss}$ routing in a non-power gated application, and for virtual ground ($V_{ssv}$) routing, as is here illustrated, when used with tapped switch cells or with a combination of tapless switch cells and tap cells. Second, since the virtual ground is localized—i.e., completely isolated between two switch cells (e.g., switch cells 805 and 806), the standard cells need not provide room for vertical power routing, thus saving vertical routing resources.

The design method shown in FIG. 8 has the following characteristics:

(a) a region of power-gated standard cells, known as a sub-row, is created within a standard cell row;
(b) the power-gated region is encapsulated by switch cells that isolate the power gated region from other power gated regions and non-power gated regions;
(c) the physical layout of the switch cell is designed such that the portion of the context-sensitive rail abutting the tapless standard cell is utilized as a virtual ground rail while the other portion of the context-sensitive rail serves as a real ground rail.

Therefore, significant area reduction is achieved by (a) eliminating a third rail within each standard cell, which also reduces horizontal routing resource requirements and (b) eliminating, if desired, global virtual ground routing (i.e., the virtual ground being segmented and not interconnected between rows), thereby reducing the requirement for vertical routing resources. The significant area reduction is achieved without requiring modification in the tapless standard cell layout. A method of the present invention allows a conventional tapless standard cell library to be used with power gating applications that utilize virtual grounds, or virtual power supplies, or both. Further, in an integrated circuit where global virtual ground routing is practiced, the high capacitance in the global virtual ground wires can cause a large "rush" current when the switch cells switch to their conducting states. In contrast, the segmented virtual ground system of the present invention isolates virtual ground segments of relatively low capacitances, which need not all be switched on at the same time, so that the rush current is reduced when conduction in the switch cells occur.

Figure 9:
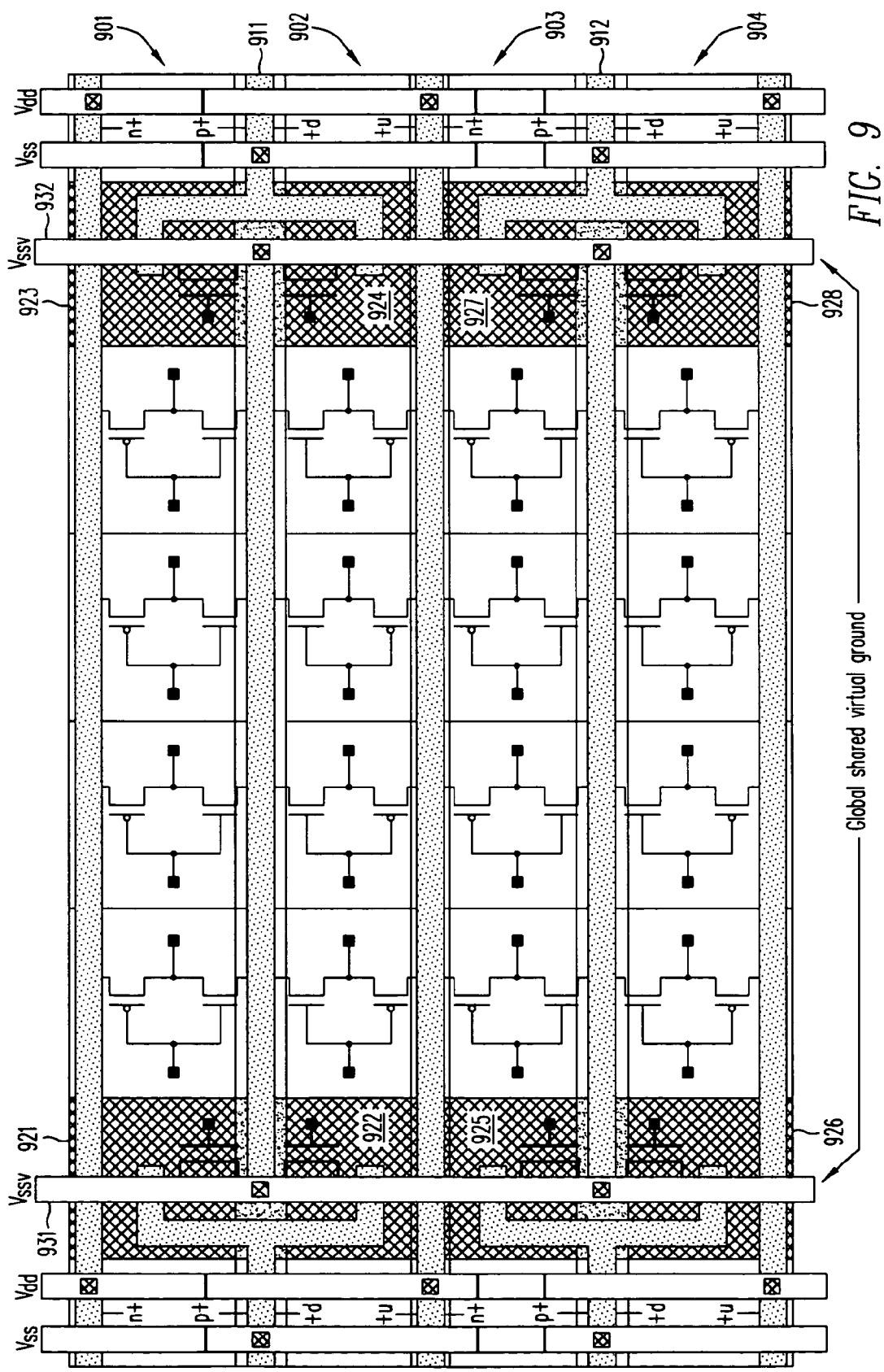
FIG. 9 illustrates the tapless switch cell and its use in a grid switches type design method, in accordance with a second embodiment of the present invention.
Figure 10:
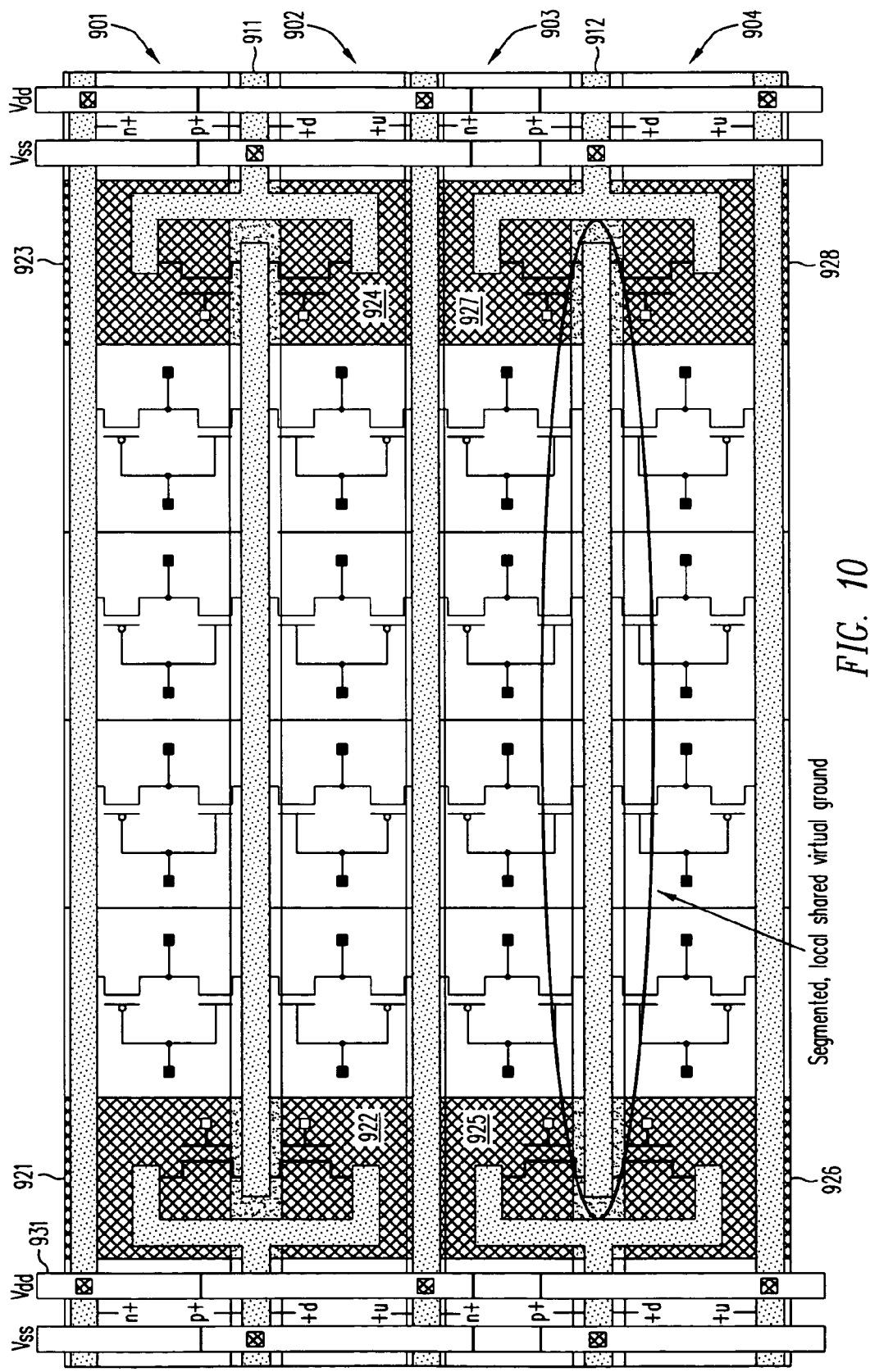
FIG. 10 illustrates the tapless switch cell and its use a grid switches type design method, in accordance with a third embodiment of the present invention.

FIGS. 9 and 10 show additional embodiments of the present invention using the tapless switch cell and standard cells from a tapless library. As shown in FIG. 9, four rows 901, 902, 903 and 904 of standard cells each configured in the manner illustrated in FIG. 8. Rows 901 and 902 (and likewise rows 903 and 904), are mirror images of each other, so that virtual ground wire 911 (and likewise virtual ground wire 912) form a segmented virtual ground rail encapsulated between switch cells 921-924 (likewise, switch cells 925-928). In FIG. 9, the virtual ground rails are interconnected by vertically running $V_{ssv}$ rails 931 and 932.

FIG. 10 shows an integrated circuit configuration substantially similar to that shown in FIG. 9, except that the virtual ground rails are not interconnected by vertically running $V_{ssv}$ rails, so that the segmented virtual ground rails are isolated from each other. Compared to the circuit configuration of FIG. 9, the circuit configuration of FIG. 10 requires much reduced vertically running routing resources. However, if the physically electrically isolated virtual ground rails belong to the same sleep domains (i.e., the switch cells are controlled by the same control signal), the virtual ground rails may be considered substantially interconnected, when the switch cells are in the conducting state.

The detailed description above is provided to illustrate the specific embodiments of the present invention and is not intended to be limited. Numerous modifications and variations within the scope of the present invention are possible. The present invention is set forth in the following claims.

I claim:

1. An integrated circuit comprising:
  a plurality of rows of cells, each row of cells comprising:
    a plurality of logic cells each having a conductive trace positioned at a first predetermined distance relative to a common border of the logic cell and laid out along a predetermined direction, the logic cells being laid out abutting each other such that the conductive traces form a power rail along a length of the logic cells;
    a switch cell comprising:
      a first conductive trace abutting the power rail;
      a second conductive trace spatially separated from the first conductive trace, and wherein the second conductive trace being laid out also at the first predetermined distance relative to the common border; and
      a transistor providing a selectably enabled conduction path between the first conductive trace and the second conductive trace; and
    a tap cell positioned within a second predetermined distance from the switch cell and the logic cells, so as to provide a substrate connection to a power supply or ground rail; and
  wherein the power rails of the rows of cells are interconnected by conductive traces running in a direction orthogonal to the predetermined direction, and wherein the tap cells of the rows of cells are aligned to provide portions of the conductive traces interconnecting the power rails.

2. A method for laying out an integrated circuit, comprising:
  providing a plurality of rows of cells, each row of cells comprising:
    a plurality of logic cells each having a conductive trace positioned at a first predetermined distance relative to a common border of the logic cell and laid out along a predetermined direction, the logic cells being laid out abutting each other such that the conductive traces form a power rail along a length of the logic cells;
    a switch cell comprising:
      a first conductive trace abutting the power rail;
      a second conductive trace spatially separated from the first conductive trace, and wherein the second conductive trace being laid out also at the first predetermined distance relative to the common border; and
      a transistor providing a selectably enabled conduction path between the first conductive trace and the second conductive trace; and
  providing a tap cell positioned within a second predetermined distance from the switch cell and the logic cells, so as to provide a substrate connection to a power supply or ground rail; and
  wherein the power rails of the rows of cells are interconnected by conductive traces running in a direction orthogonal to the predetermined direction, and wherein the tap cells of the rows of cells are aligned to provide portions of the conductive traces interconnecting the power rails.

3. An integrated circuit comprising:
  a plurality of rows of cell means, each row of cell means comprising:
    a plurality of cell means for performing logic, each having a means for conduction positioned at a first predetermined distance relative to a common border of the logic cell means and laid out along a predetermined direction, the logic cell means being laid out abutting each other such that the conductive means form a power rail along a length of the logic cell means;
    switch cell means comprising:
      a first means for conducting that abuts the power rail;
      a second means for conducting that is spatially separated from the first conductive means, and wherein the second conductive means being laid out also at the first predetermined distance relative to the common border; and
      means for providing a selectably enabled conduction path between the first conductive means and the second conductive means; and
  tap cell means, positioned within a second predetermined distance from the switch cell means and the logic cell means, and being a means for providing a substrate connection means to a power supply means or a ground rail means; and
  wherein the power rails of the rows of cell means are interconnected by means for conduction running in a direction orthogonal to the predetermined direction, and wherein the tap cells means of the rows of cell means are aligned to provide portions of the conductive means interconnecting the power rails.

* * * * *